United States Patent [19]

Kaup

[11] Patent Number: 6,115,503
[45] Date of Patent: Sep. 5, 2000

[54] METHOD AND APPARATUS FOR REDUCING CODING ARTIFACTS OF BLOCK-BASED IMAGE ENCODING AND OBJECT-BASED IMAGE ENCODING

[75] Inventor: Andre Kaup, Hoehenkirchen, Germany

[73] Assignee: Siemens Aktiengesellschaft, Munich, Germany

[21] Appl. No.: 08/887,577

[22] Filed: Jul. 3, 1997

[30] Foreign Application Priority Data

Jul. 4, 1996 [DE] Germany .......................... 196 26 985

[51] Int. Cl.[7] .............................. G06K 9/00; G06K 9/36; G06K 9/40
[52] U.S. Cl. ......................... 382/268; 382/166; 382/254; 382/275; 348/606; 348/607
[58] Field of Search .................................. 382/166, 262, 382/268, 275, 254; 348/606, 607, 610; 358/433

[56] References Cited

U.S. PATENT DOCUMENTS

| | | | |
|---|---|---|---|
| 4,754,492 | 6/1988 | Malvar ..................................... | 382/268 |
| 5,454,051 | 9/1995 | Smith ...................................... | 382/268 |
| 5,495,538 | 2/1996 | Fan ........................................ | 382/268 |
| 5,594,816 | 1/1997 | Kaplan et al. ........................... | 382/275 |
| 5,673,340 | 9/1997 | Kanda ..................................... | 382/275 |
| 5,694,492 | 12/1997 | Kim ....................................... | 382/268 |
| 5,732,159 | 3/1998 | Jung ....................................... | 382/262 |
| 5,852,682 | 12/1998 | Kim ....................................... | 382/268 |
| 5,881,180 | 3/1999 | Chang et al. ........................... | 382/268 |

FOREIGN PATENT DOCUMENTS 0 666 695  8/1995  European Pat. Off. .

OTHER PUBLICATIONS

Clark; *Transform Coding of Images*, Chapter 3: "Orthogonal Transforms for Image Coding", Academic Press, 1985, pp. 72–134.

Chen, et al "A Block Transform Coder for Arbitrarily Shaped Image Segments", IEEE, 1994.

Liou, "Overview of the px64 kbits/s Video Coding Standard", Communications of the ACM, vol. 34, No. 4, Apr. 1991, pp. 60–63.

Wallace, "The JPEG Still Picture Compression Standard", Communications of the ACM, vol. 34, No. 4, Apr. 1991, pp. 47–58.

Y. Yang et al., "Regularized Reconstruction To Reduce Blocking Artifacts Of Block Discrete Cosine Transform Compressed Images", IEEE Transactions on Circuits and Systems for Video Technology, vol. 3, No. 6, Dec. 1993, pp. 421–432.

T. O'Rourke et al., "Improved Image Decompression For Reduced Transform Coding Artifacts", IEEE Transactions on Circuits and Systems for Video Technology, vol. 5, No. 6, Dec. 1995, pp. 490–499.

(List continued on next page.)

*Primary Examiner*—Phuoc Tran
*Assistant Examiner*—Daniel G. Mariam
*Attorney, Agent, or Firm*—Hill & Simpson

[57] ABSTRACT

A method and apparatus for enhancing decoded images which have been encoded checks the neighboring picture elements of a picture element which are located in the region of the picture element to see whether the brightness values and/or the color values of the neighboring picture elements is similar enough to brightness values and/or color values of the picture element in question according to a similarity criterion such as a threshold. When the similarity is within the threshold, then the corresponding neighboring picture element is taken into consideration in determining a new brightness value for the picture element in question. Neighboring picture elements are taken into consideration when the neighboring picture element and the picture element are located in different image blocks of the image which has been decoded from a block-based encoding process. Neighboring picture elements are not taken into consideration when the neighboring picture element and the picture element are located in different objects of the image which has been decoded from an object-based image encoding process.

23 Claims, 5 Drawing Sheets

OTHER PUBLICATIONS

MIT Press, Chapter 6, The Discrete Problem, pp. 111–125.

T. Özcelik et al., "Image And Video Compression Algorithms Based On Recovery Techniques Using Mean Field Annealing", Proceedings of the IEE, vol. 83, No. 2, Feb. 1995, pp. 304–315.

MPEG–4 Video Verification Model Version 2.0, ISO/IEC JTC1/SC29/WG11, Mar. 1996, pp. 1–62.

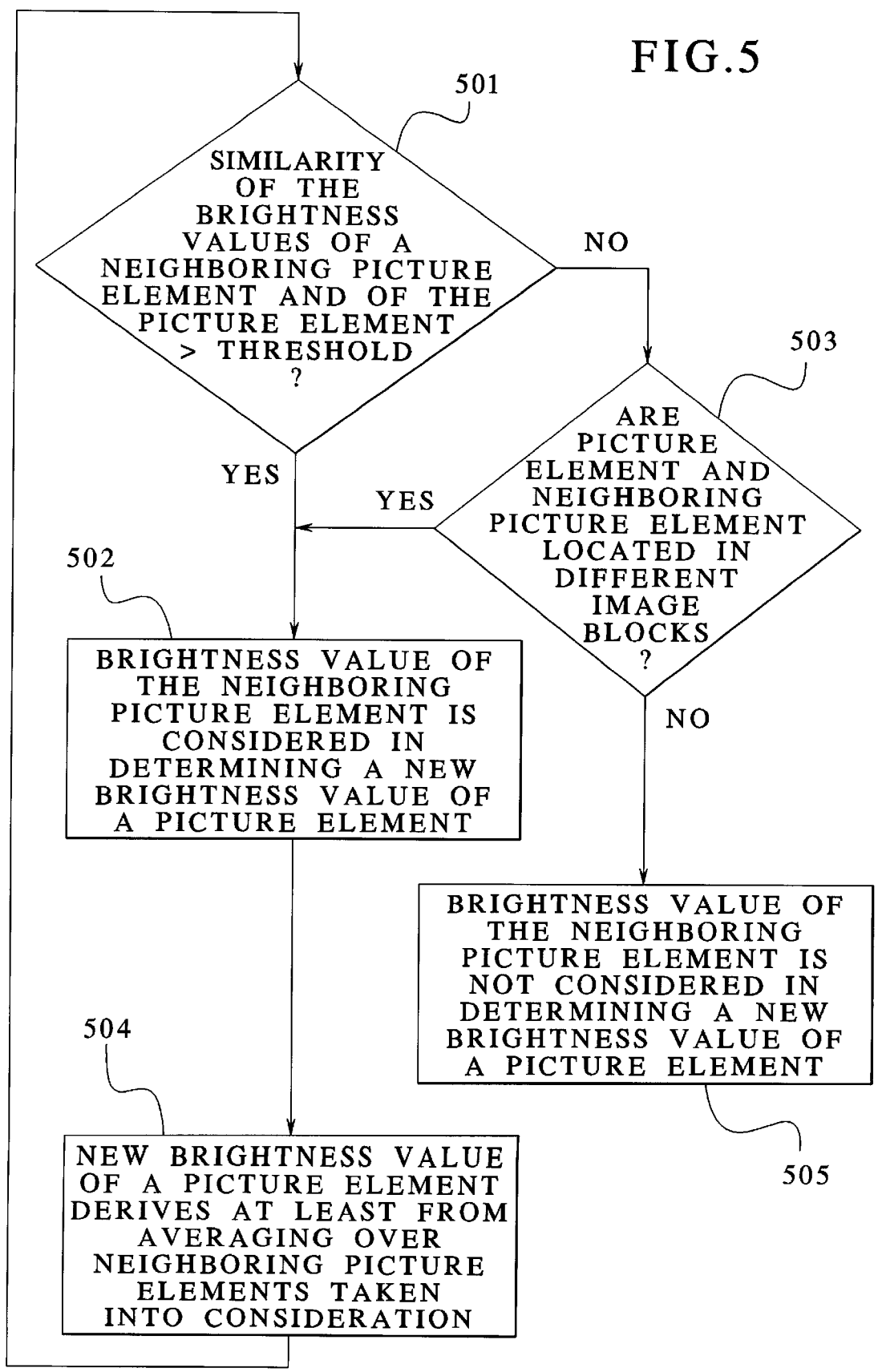

METHOD AND APPARATUS FOR REDUCING CODING ARTIFACTS OF BLOCK-BASED IMAGE ENCODING AND OBJECT-BASED IMAGE ENCODING

BACKGROUND OF THE INVENTION

1. Field of the Invention

The present invention relates generally to a method and apparatus for reducing the coding artifacts which appear in images which are encoded by block-based and/or object-based encoding.

2. Description of the Related Art

In image encoding methods which are based either on block-based transformation encoding or on object-based transformation encoding, digitized images are divided into blocks or objects, respectively, and each block or object is sequentially encoded independently of neighboring blocks or objects. Coding errors which disturb the image and which are referred to as coding artifacts may arise, particularly at high compression factors, due to the independent encoding of the image blocks or image objects. An example of a coding artifact may be seen in the formation of the artificial edge at the block margin in what is referred to as a block artifact, or in the ring-like patterns at gray scale discontinuities in what is referred to as ringing in the encoded image. For a viewer of an image which has been encoded and decoded with an image encoding method based on one of the above-described principles, the encoding errors leads to a noticeable deterioration in the subjective quality of the decoded image which increases with increasing compression of the image data.

Various methods are known which are based on the principle of block-based transformation encoding. The following image encoding methods are a selection of block-based image encoding processes:

JPEG;

MPEG 1, MPEG 2, or

H.263.

Object-based image encoding methods are also known.

A method of block-based image encoding is known which also utilizes the framework of an object-based image encoding method.

Two fundamental approaches have been used for reducing the coding errors which occur under the boundary condition of the compatibility of the known image encoding methods. First, an arrangement and a method are known with which a decoded image is made smoother by a low-pass filter which follows the decoding apparatus, wherein the low-pass filter that is used may be a global filter or a local adaptive filter. A considerable disadvantage in this method is that not only does the filtering remove artificial gray scale discontinuities at the block margins as intended but it also causes an undesirable smoothing of the high-frequency details within the image so that the viewer perceives the details as being of only poor quality or perhaps does not see the details at all.

To avoid the undesired smoothing of important details in the image, the low-pass filtering operation may be limited to the block margins. Such a method is known although it has disadvantages in that what are referred to as ringing effects that are typically distributed over the entire image block cannot be eliminated.

According to another process, the image enhancement is implemented on the basis of prior knowledge about the encoded image. In this method, the decoding process is not the simple inversion of the transmission-side encoding but instead is carried out as an optimization problem. The receiving side thus determines that the image conforms to the received, quantized image data on one hand, but also meets certain boundary conditions of typical image data such as, for example, smoothness, on the other hand. This procedure has the disadvantage that the method requires extremely high complexity and the boundary conditions are formulated both in the time domain as well as in the frequency domain and a constant change between the domains is required in the image enhancement process. It is not possible to provide a real-time realization of this method in video communications.

A known image enhancement method is implemented so that a new brightness value or color value is determined for a picture element of an image and is allocated to the picture element, the brightness and/or color value being determined from a determination of the old, decoded brightness value or color value of the picture element and directly from the neighboring picture elements.

There are particular disadvantages to this method in that, independently of the semantics of the image, all the neighboring picture elements are taking into consideration in the averaging of the brightness values or color values. The semantics of the image here means the size of the difference in the brightness values of neighboring picture elements or whether two picture elements are located in different image blocks of different objects. This method leads to a slight image enhancement in the decoding of the digitized image.

SUMMARY OF THE INVENTION

An object of the present invention is to provide a simple, locally adaptive method with which undesired image artifacts are eliminated from an image without the lost of high frequency detail structure which may be present in the image. The present invention provides an image encoding unit as well as an image decoding unit in which the method for image enhancement is implemented.

According to the method of the invention, coding artifacts in block-based image encoding methods are reduced, wherein neighboring picture elements for at least part of the picture elements of the image are checked where there is a difference in the brightness values or color values of respective neighboring picture elements compared to a picture element that is below a predetermined threshold. When this is the case, it means that there is a greater probability that no detailed structure is contained in the image area and the respective neighboring picture element is considered together with the picture element in question in determining a new brightness value or new color value for the picture element. When, however, the difference in brightness values is greater than the predetermined threshold, then the corresponding neighboring picture element is not considered in the determination of the new brightness value or color value of the picture element. In this method, a new brightness or color value for the corresponding picture element is determined in that a new brightness value or color value for the picture element is determined from the brightness values or color values of neighboring picture elements that are taken into consideration. The neighboring picture element is considered either when the difference in the brightness value or color value is below the predetermined threshold or when the picture element and the neighboring picture element are located in different image blocks of the image. In this case, an image artifact may arise which is eliminated by appropriate consideration in the determination of the new brightness value or color value. Considering the neighboring picture elements in the determination of the new brightness value or color value for the picture element is comparable to a smoothing or low-pass filtering of the brightness values or color values of the picture element with the environment of the picture element.

In the present method, whether the smoothing should ensue or not in the respective direction to the picture element is separately considered for each picture element and, thus, for an arbitrary number of directions within the image. An image enhancement of a significantly higher granularity or detail, is thus possible taking into consideration the semantics of the image content that is established by the differences of the brightness values or color values of the picture elements. This leads to a simple, quickly implemented and, nonetheless, very exact image enhancement while reducing the coding artifacts of block-based coding methods.

According to a further method of the present invention, the invention is applicable to object-based image encoding methods and their special characteristics. By contrast to block-based image encoding methods where the point is to smooth the block artifacts at the block margins, which occurs by considering neighboring picture elements that are in different image blocks than the picture element itself in determining the new color or brightness value, in object-based image encoding methods there is the necessity that the edges of the object margins are preserved and, contrary to the block encoding methods, a filtering over the object margins simply does not occur.

In object-based image encoding methods, the neighboring picture element is only considered in the determination of the new brightness value or color value when, first, the difference of the brightness values or color values is smaller than the threshold and when the picture element and the neighboring picture element are not located in different image objects of the image. This avoids any undesired smoothing of the object margins.

In a further embodiment of the invention, the image encoding unit includes means for the transformation coding of the quantization of the transfer coefficients, for inverse quantization of the quantized transformation coefficients as well as for the inverse transformation coding. Further, an image storage for storing image data and a means for predicting the image data of two chronologically successive images are provided. Another means is provided which is configured such that one of the methods for the reduction of coding artifacts is implemented which includes an image encoding unit with what is referred to as a "filter in the loop" is created. As a result, an improvement in the prediction has been realized in that it becomes possible to reduce the set of difference image information to be encoded and transmitted. A faster and more exact arrangement for image encoding that is superior to the standard image encoding units is proposed with this image encoding unit that leads to a smaller set of image data that can be transmitted compared to the known image encoding units.

In addition to means for inverse quantization and inverse transformation coding, the image encoding unit according to another aspect of the invention includes an image storage, a means for predicting image data as well as a means for implementing the reduction of coding artifacts. With the image encoding unit, an image that exhibits substantially higher quality than an image that has been decoded with a known decoder unit is decoded and presented to the user. The coding artifacts are substantially reduced and the implementation of the method is very fast.

An advantage of the invention will become apparent after a review of the following.

When a block-based image encoding method is also used, it is advantageous in the framework of object-based image encoding method to check the neighboring picture elements to determine whether the picture element and the neighboring picture element are located in the same image block. The neighboring picture element is also taken into consideration in the determination of the new brightness value or color value of the picture element when the picture element and the neighboring picture element are located in different image blocks. This corresponds to the situation where block artifacts that arise due to the use of the block-based image encoding method are to be smoothed within an image object.

It is also advantageous in another development of the invention to consider the brightness value or color value of the picture element under investigation itself in determining the new brightness value or color value of the picture element. This leads to a more qualitatively improved decoding process since this achieves an image which has been processed according to this method which is as similar as possible to the decoded image.

A further advantage is provided by considering only the neighboring picture elements that directly adjoin the picture element in question. As a result of this development, the processing of the present method is substantially simpler and is considerably accelerated using a computer or an image encoding unit to implement the method. This is attributed to the fact that, given the application of this development, a smaller number of neighboring picture elements are investigated and considered at all using this criteria. This also leads to a lower loss in picture quality since the principal information about the brightness differences and color differences within an image are contained in directly adjoining picture elements.

It is another advantage of the present method to consider the neighboring picture elements which are located along a first direction with respect to the picture element in question in a first iteration and to only consider the neighboring picture elements along a second direction in the area of the picture element in a second iteration.

A further development of the invention provides that the method is repeatedly applied to an image with a result that the coding artifacts are further improved. It is a further advantage to determine the quality of the improved image after every iteration of the method and to decide, depending on the quality which is determined, whether a further iteration would be meaningful or not. In this way it is possible to provide an exact balancing of the required quality with the corresponding required calculating time to assure the required quality of an image. The present image improvement methods can be used either in image post-processing for image enhancement or it can be used within the framework of the prediction of an image to be encoded. The use of the method in the prediction in an image encoding unit is advantageous to reduce the prediction error which arises in the formation of the difference image. By reducing the prediction error, a lower data rate in the transmission of the image information as well as a lower calculating capacity required for encoding is achieved.

BRIEF DESCRIPTION OF THE DRAWINGS

FIG. 5 is a flow chart showing a method for block-based image encoding according to the principles of the present invention;

DETAILED DESCRIPTION OF THE PREFERRED EMBODIMENTS

In Figure is shown schematically an image B which is in digitized form. The image B includes an arbitrary number of picture elements, or pixels, BP. The picture elements BP whose coordinates within the image B are unambiguously identified with a row index i and a column index j, are grouped in a number of image blocks BB in the image B. Standard image encoding methods use the image blocks BB, for example the JPEG compression method and the MPEG compression method use image blocks BB having a size of 8×8 picture elements BP or 16×16 picture elements BP.

Figure 1:
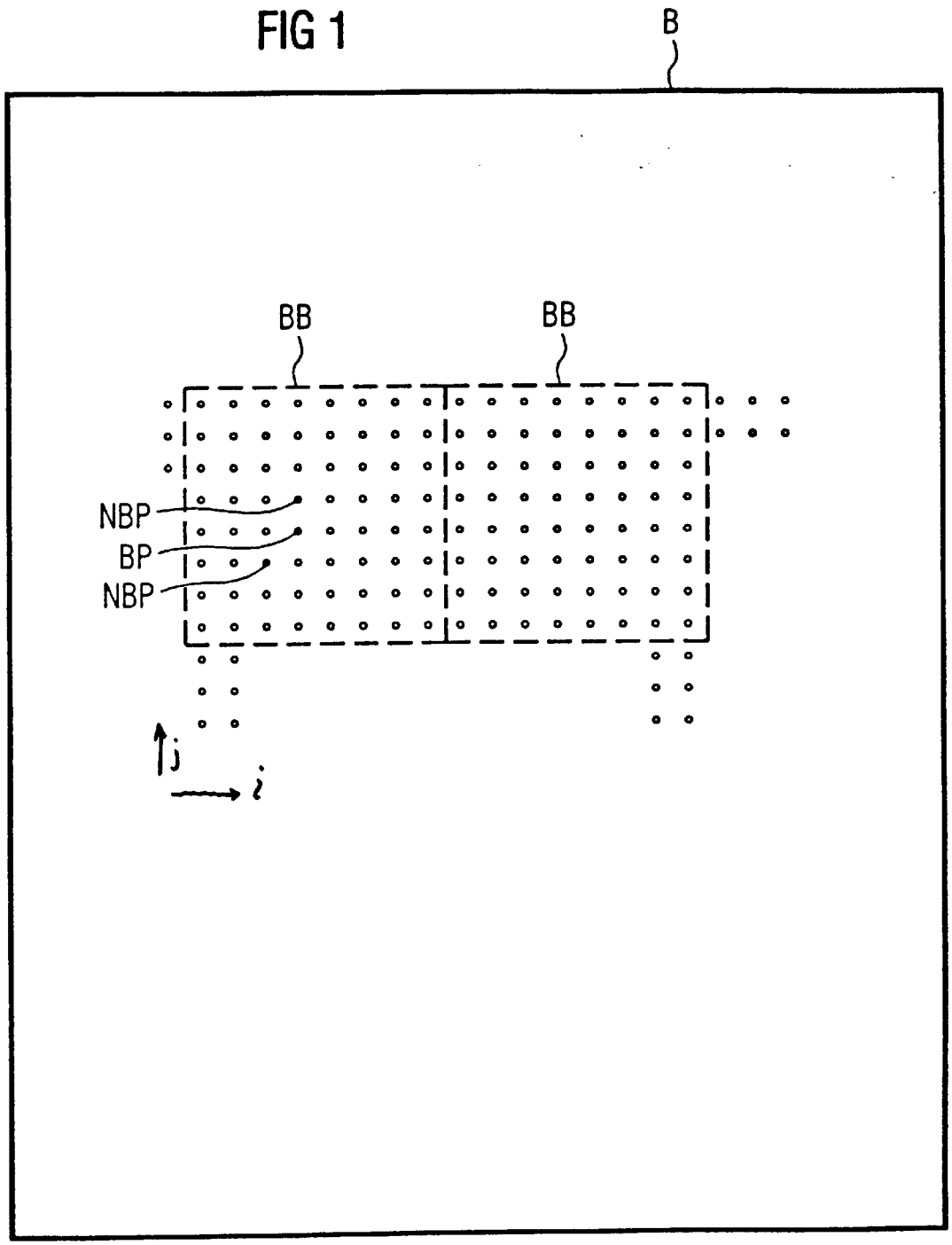
FIG. 1 is schematic diagram showing an image which is subjected to a block-based image encoding method.
Figure 2:
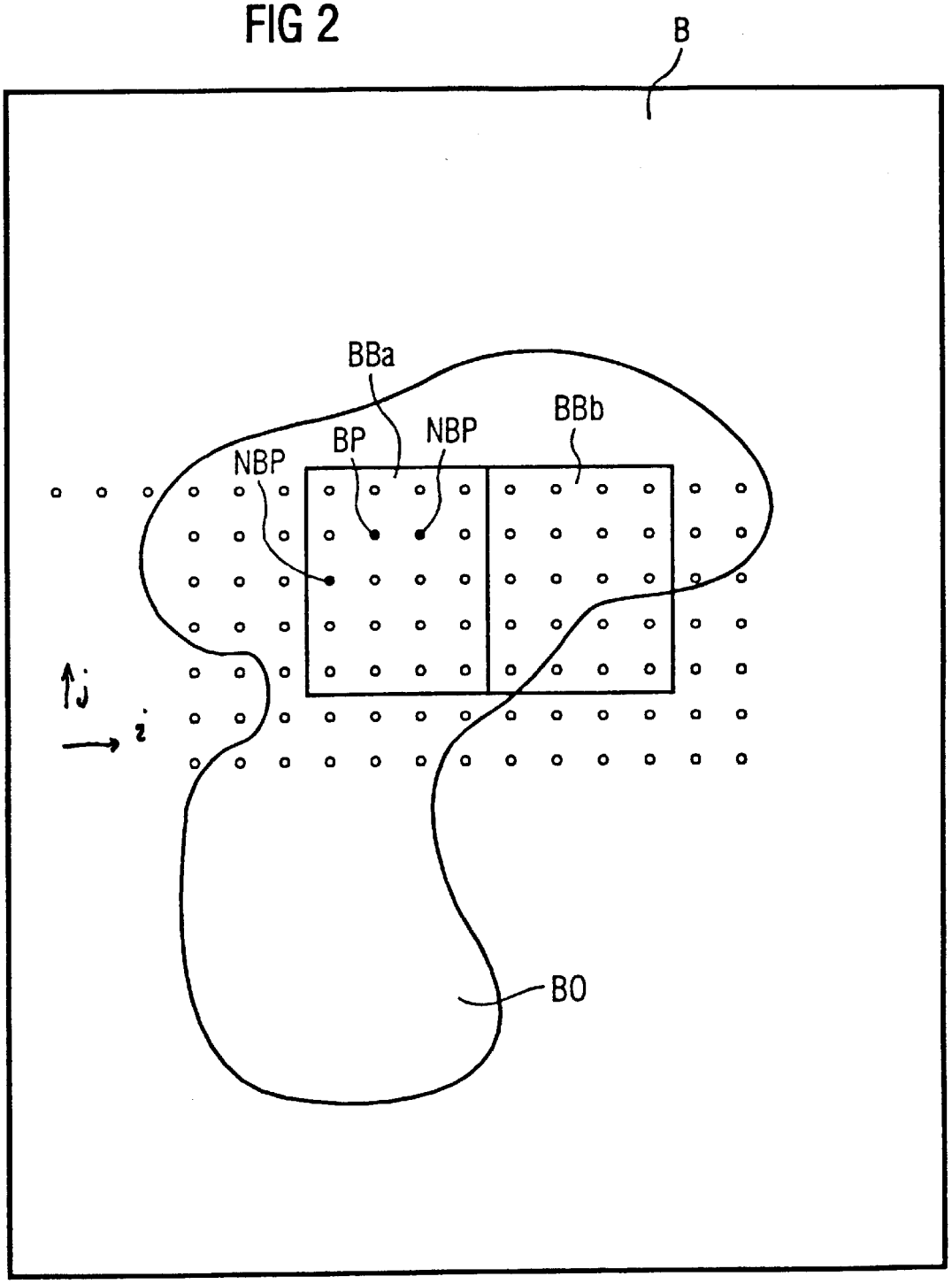
FIG. 2 is a schematic diagram of an image which is subjected to an object-based image encoding method.

Referring to FIG. 2, a digital image B is shown which is to be subjected to an object-based encoding method. The image B is segmented into various image objects BO according to the semantics, or content, of the image. The image objects BO exhibit an arbitrary edging and have an arbitrary number of picture elements BP.

Methods are also known where object-based image encoding methods and block-based image encoding methods are combined with one another. This is indicated by the illustration of image blocks BBa and BBb which are within the image object BO in FIG. 2.

Figure 3:
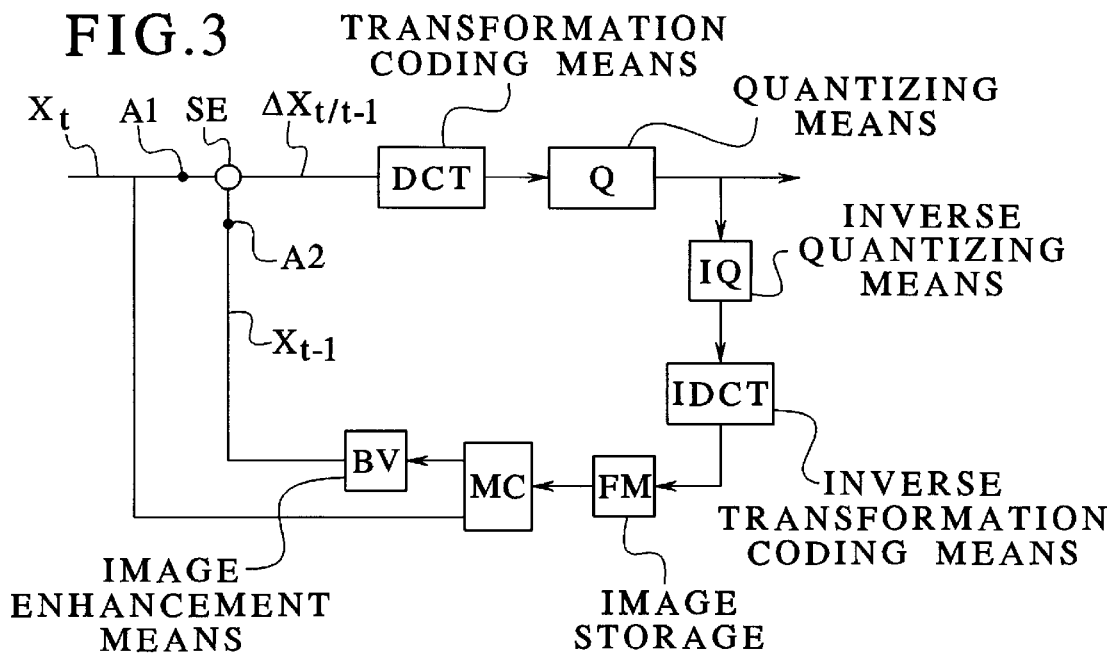
FIG. 3 is a functional block diagram of an image encoding unit.

Referring to FIG. 3, an image encoding unit is shown which encodes image data $x_t$ of an image B at a time t which has been supplied to the image encoding unit. The image encoding unit includes at least the following components:

- a first means DCT for transformation coding (wherein DCT refers discrete cosine transform, for example);
- a second means Q for quantizing the transformation encoding coefficients that are formed by the first means DCT and which are supplied to the second means Q;
- a third means IQ for inverse quantization of the quantized transformation coefficients;
- a fourth means IDCT for the inverse transformation coding of the quantized transformation coefficients;
- an image storage, or memory, FM for storing the image data;
- a fifth means MC for prediction of the image data of two chronologically successive images; and
- a sixth means BV for image enhancement.

In operation, the illustrated apparatus provides an arbitrary transformation encoding, which is, for example a discrete cosine transformation (DCT), which is applied by the first means DCT to the image data $x_t$ supplied to the first means.

Figure 7:
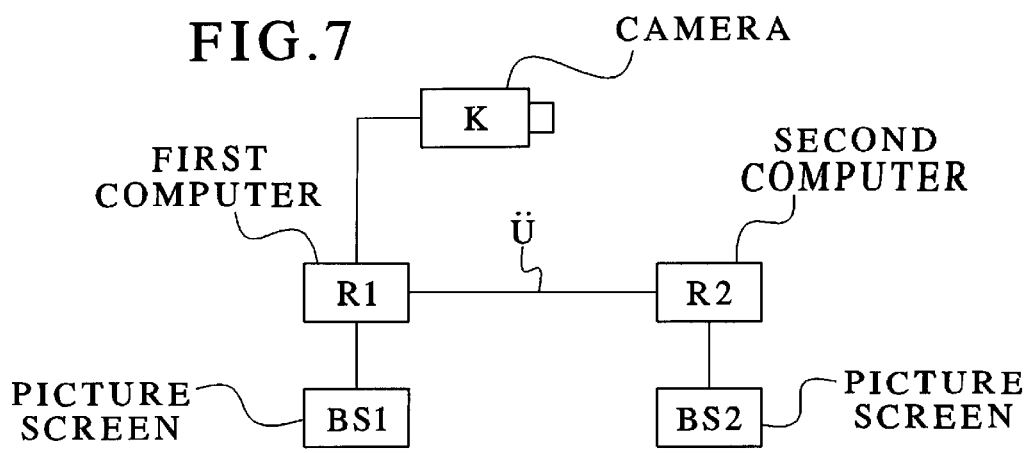
FIG. 7 is a functional block diagram of a computer arrangement which may be used for implementing the present method.

In addition to the foregoing elements, a subtraction unit SE is provided to which the image data $x_t$ of the image B to be encoded at a time t are supplied via a first input A1. Image data $x_{t-1}$ of a chronologically preceding image B are supplied to the subtraction unit SE via a second input A2 to the subtraction unit SE. After forming the difference of the image data, only the difference image information $\Delta x_{t/t-1}$ are supplied to the first means, DCT. Thus, the difference image information is transmitted in the encoding of an image. It is also provided to transmit what are referred to as supporting images, whereby it is not only the difference information but the entire image information $x_t$ that is supplied to the first means DCT for the transformation encoding. A transformation encoding is applied to the image data $x_t$ or to the difference image data $\Delta x_{t/t-1}$, the transformation coefficients for the image data $x_t$ and $\Delta x_{t/t-1}$ being determined therewith. The transformation coefficients are supplied to the second means Q where they are quantized. As described below, the quantized transformation coefficients are transmitted from a first computer R1 to at least one second computer R2 (as shown in FIG. 7). To be able to determine the difference image data $\Delta x_{t/t-1}$, the quantized transformation coefficients are used to predict the chronologically following image. The quantized transformation coefficients are inversely quantized in the third means IQ, and the inversely quantized transformation coefficients are subjected to an inverse transformation coding IDCT in the fourth means IDCT. For predicting, for example, a motion estimate of image blocks BB or image objects BO in two chronologically successive images B in the fifth means MC, time redundancy in the image information is determined and filtered out by difference information in the subtraction unit SE and is thus no longer encoded and also no longer transmitted.

The sixth means BV for image enhancement in the prediction path of the image encoding unit is formed so as to carry out the method steps of the method according to the present invention.

According to a development of the present invention, the image encoding unit includes a seventh means for segmenting the image into image blocks BB for block-based encoding methods or for segmenting the image into image objects BO for object-based image encoding methods.

Figure 4:
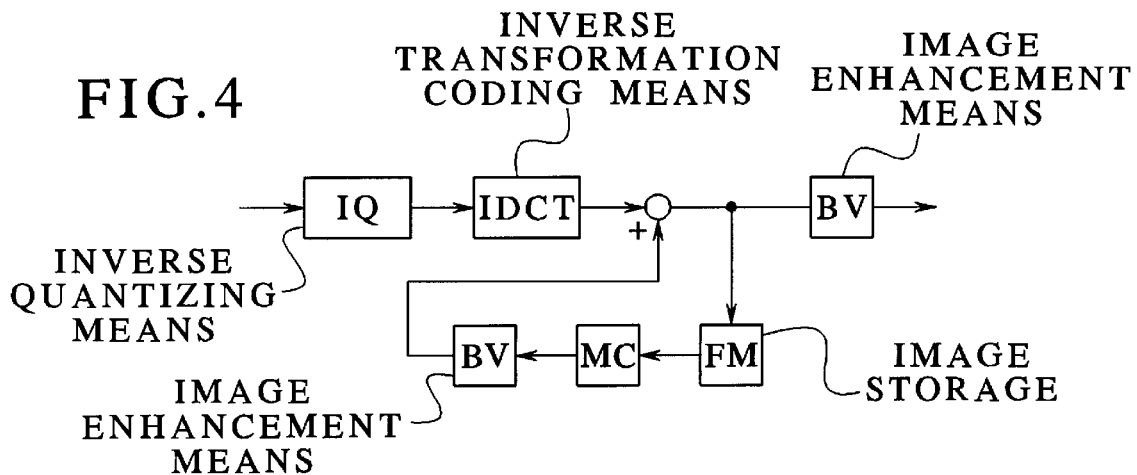
FIG. 4 is a functional block diagram of an image decoding unit.

In FIG. 4, an image decoding unit is shown which is based upon the same principles as the image encoding unit of FIG. 3. The image decoding unit includes at least the following components:

- a third means IQ,
- a fourth means IDCT,
- an image storage FM,
- a fifth means MC, and
- at least one sixth means BV for image enhancement.

The image decoding unit of FIG. 4 provides the image enhancement, which here refers to the reduction of coding artifacts, following the actual image decoding and/or as in the image encoding unit, the image enhancement is integrated in the prediction path for the reconstruction of the image B.

When the sixth means BV follows the actual image decoding, then the decoded image data which is in the form of brightness values $g_{ij}$ or color values which are allocated to the picture elements BP are supplied to the sixth means BV. The brightness values $g_{ij}$ and/or color values are usually allocated to the picture elements, or pixels, in the image encoding methods. For the sake of simplicity, only the brightness values $g_{ij}$ that are allocated to the picture elements shall be described below. However, it is within the scope of the present invention to also consider the color values, either by themselves or together with the brightness values, during the present image encoding method and the image enhancement method.

In FIG. 5 is shown a flow diagram of the method for block-based image encoding. The method steps are implemented for at least a part of a digitized, decoded image B.

In a first step 501, a check is carried out for at least a part of the picture elements BP of the image B or for the entire image B for neighboring picture elements NBP that are located in an environment or area having an arbitrary shape and size around the picture element to see whether the brightness values $g_{ij}$ of the neighboring picture element NBP and the picture element BP under investigation are clearly different from one another. When this is the case, it means that the sub-structure is probably present in the image region and should be preserved in the decoding process. In other words, image detail is present there that should be preserved. When, however, this is not the case, then this indicates that the image region is uniform and it is beneficial to smooth the region between the picture element BP under investigation and the neighboring picture element NBP.

The environment or area of the picture element BP within which the neighboring picture elements NBP are investigated is of an arbitrary shape and size. To accelerate the implementation of the present method, however, it is provided that only the directly neighboring, or directly adjacent, picture elements to the picture element BP in question are used as the neighboring picture elements NBP during the brightness investigation.

To reduce the coding artifacts, a new brightness value $g_{ij}$ is determined for the picture element BP to which a brightness value $f_{ij}$ was previously allocated. The new brightness value $g_{ij}$ derives at least from the brightness values $g_{ij}$ of the neighboring picture elements NBP which are taken into consideration in the determination of the new brightness value $g_{ij}$ of the picture element BP. Two criteria are applied in the decision as to whether a neighboring picture element NBP is to be taken into consideration.

First, a check is carried out to see whether the brightness value of the neighboring picture element NBP is similar enough to the brightness value $f_{ij}$ of the picture element BP using a similarity tolerance. The similarity tolerance is empirically determined by a pre-determined threshold S by the developer of the method or by the user and this value may be freely prescribed as needed.

When the difference between the brightness values of the neighboring picture element NBP and the brightness value $f_{ij}$ of the picture element BP is smaller than the threshold S, then the respective neighboring picture element is taken into consideration in the step 502 to determine the new brightness value $g_{ij}$ of the picture element BP. For purposes of the present method, the brightness value $f_{ij}$ of the picture element BP which is used in the present method may be the absolute value of the difference of the brightness values or the square thereof or an arbitrary power of the difference of the brightness values.

In the block-based image encoding method, the neighboring picture element NBP is taken into consideration in the step 503 when the neighboring picture element NBP is located in a different image block BB than the picture element BP. In this case, a block edge which would otherwise lead to what is referred to as blocking artifacts, lies between the neighboring picture element NBP and the picture element BP. The disturbing influence of the block edge on the image quality is alleviated by low-pass filtering of the block edge. The low-pass filtering corresponds to taking the neighboring picture element into consideration in determining the new brightness value $g_{ij}$ for the picture element BP.

Otherwise, the neighboring picture element NBP is not taken into consideration according to the step 505.

In the step 504, the new brightness value $g_{ij}$ derives by averaging the brightness values $g_{ij}$ which are considered for the neighboring picture elements NBP. The averaging over the individual brightness values of the neighboring picture elements NBP can be weighted in an arbitrary way.

It is provided as a development of the present method to also take into consideration the brightness value $f_{ij}$ of the picture element BP under investigation in determining the new brightness value $g_{ij}$ of the picture element BP.

This procedure can be represented in a formula according to the following rule:

$$g_{i,j} = \frac{1}{1+n\lambda}(f_{i,j} + \lambda(\delta_{i,j-1} \cdot g_{i,j-1} + \delta_{i-1,j} \cdot g_{i-1,j} + \delta_{i,j+1} \cdot g_{i,j+1} + \delta_{i+1,j} \cdot g_{i+1,j})) \quad (1)$$

with $$\delta_{i,j-1} = \begin{cases} 1 & \text{when } |g_{i,j} - g_{i,j-1}| \leq S \text{ or} \\ & \text{when } g_{i,j} \text{ and } g_{i,j-1} \text{ lie across a block boundary} \\ 0 & \text{otherwise} \end{cases} \quad (2)$$

The values for $\delta_{i-1j}$, $\delta_{ij+1}$, $\delta_{i+1j}$ are determined in the way analogous to that shown in Equation (2) above.

The number of neighboring picture elements NBP which are taken into consideration is referred by the variable n.

The above equations are valid for a development of the method wherein the brightness value $f_{ij}$ of the picture element BP is itself taken into consideration. When the brightness value $f_{ij}$ of the picture element BP is not taken into consideration, the summand 1 in the denominator of the fraction as well as the summand $f_{ij}$ is omitted in the equation 1.

The foregoing equations describe the method for investigating the neighboring picture elements NBP which are directly adjacent to the picture element BP and are located in the same column or same row of the picture element BP. For a different shape or size of the environment or area for investigating the neighboring picture elements NBP, only the summands $\delta_{ij-1}$, etc., as well as the brightness values $g_{ij-1}$, etc., of the larger environment are adapted to this larger environment.

It is not necessary according to the present method, as described above, to use an absolute value of the difference of the brightness values of the neighboring picture element NBP and the picture element BP under investigation as the similarity criterion for the consideration of the neighboring picture elements NBP. Any similarity criterion can be used, such as, for example an arbitrary-power of the difference of the brightness values.

A free parameter $\lambda$ determines whether more weight should be placed on the trueness to the original image for the decoded image or on the smoothing of the coding errors in determining the new brightness value $g_{ij}$ of the picture element BP during the development which takes the brightness value $f_{ij}$ of the picture element BP into consideration. It has proven advantageous as a suitable compromise to use, for example, a value of $\lambda=1$ for the free parameter.

In experiments, a value for the threshold S between 5 and 10 has proven advantageous for the threshold S in the equation 1 and 2, given a quantization of the brightness values in values ranging between 0 and 255.

Figure 6:
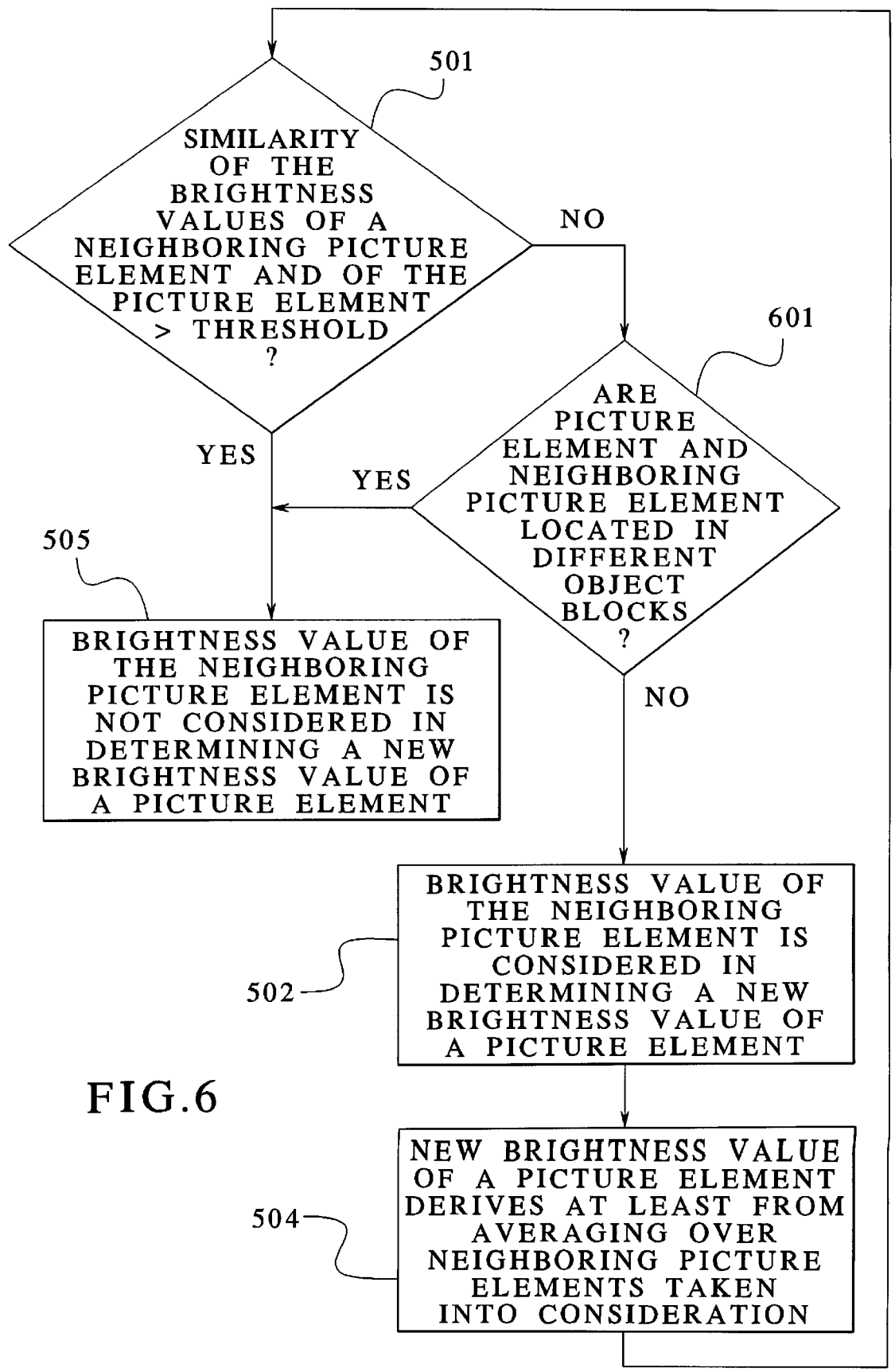
FIG. 6 is a flow chart showing individual method steps in a method for object-based image encoding according to the present invention.

Referring to FIG. 6, the use of the present invention for object-based image encoding is shown in a flow chart of the method steps, wherein the method steps are fundamentally equivalent to those of the embodiment illustrated in FIG. 5. The difference is that the criterion that the neighboring picture elements NBP are also taken into consideration when they lie in a different image block BB than the picture element BP is not employed. To the contrary, in object-based image encoding methods importance is attached to preserving the object edges formed by the various image objects BO as detail structure and, thus, these structures are not to be smoothed.

As an example, the following rule derives in the use of an object-based image encoding method during the present image enhancement method:

$$g_{i,j} = \frac{1}{1+n\lambda}(f_{i,j} + \lambda(\delta_{i,j-1} \cdot g_{i,j-1} + \delta_{i-1,j} \cdot g_{i-1,j} + \delta_{i,j+1} \cdot g_{i,j+1} + \delta_{i+1,j} \cdot g_{i+1,j})) \quad (3)$$

with $$\delta_{i,j-1} = \begin{cases} 1 & \text{when } |g_{i,j} - g_{i,j-1}| \leq S \text{ and} \\ & \text{when } g_{i,j} \text{ and } g_{i,j-1} \text{ do not lie across an object boundary} \\ 0 & \text{otherwise.} \end{cases} \quad (4)$$

As a modification of the equations 1 and 2, a neighboring picture element NBP is only taken into consideration when determining the new brightness value $g_{i,j}$ of the picture element BP under investigation when both the neighboring picture element NBP and the picture element BP are located in the same image object BO, as indicated in step 601.

As a development of the present method, when used within the framework of an object-based image encoding method, it is provided that, when a block-based image encoding is also used and the image object BO includes a plurality of image blocks BB, a check is made for the respective neighboring picture element NBP when the neighboring picture element NBP and the picture element BP are located in the same image object BO and also located in the same image block BB within the image object BO. The neighboring picture element NBP is also considered when determining the new brightness value $g_{ij}$ of the picture element when the picture element BP and the neighboring picture element NBP are located in different image blocks BB in the image object BO.

The present method may be implemented either row-by-row or column-by-column for the picture elements BP of an image B.

When determining the new brightness value $g_{ij}$ of the picture element BP, it is provided as a further development of the present method to investigate only the picture elements BP that lie along a first direction from the picture element BP such as, for example, along a row, as a neighboring picture element NBP in a first iteration of the method. The second iteration of the method provides to consider only the picture element along a second direction, such as along a column, from the picture element BP.

Yet another development of the present method provides for implementing a plurality of iterations for the image in the image enhancement process for the elimination of coding artifacts. This leads to a further improvement of the decoded image which is to be ultimately presented to a user.

It is also advantageous in this development to determine the quality criterion to evaluate the quality of the improved image at the end of every iteration. A decision is then made, depending on the determined quality, as to whether a further iteration is necessary or not for the image enhancement. This determination can ensue depending on the predetermined minimum quality for the image which is to be ultimately displayed.

The present invention provides that the required quality for the images is freely prescribable. For example, the above method can be utilized in isolation as an image enhancement method or can be used in combination with image decoding or even in the image encoding process itself to predict chronologically successive images.

In FIG. 7 is a block diagram showing a computer arrangement with which the present method is usually implemented. Images are registered with a camera K, which is coupled to the first computer R1. The images are either digitized in the camera K or in the first computer R1 to form a digital image B.

The digital image can also be obtained by a scanner or other digital image source. The first computer R1 is coupled to a first picture screen or display BS1 as well as to a second computer R2 via a coupling U. The second computer R2 also includes a picture screen BS2.

The image B is encoded in the first computer R1 and is transmitted over the coupling U to the second computer R2. The encoded image B is decoded in the second computer R2 and is presented to a viewer on a second picture screen BS2.

Thus, there is shown and described a method and apparatus for image enhancement of decoded images which have been encoded by either block-based encoding or object-based encoding.

Although other modifications and changes may be suggested by those skilled in the art, it is the intention of the inventor to embody within the patent warranted hereon all changes and modifications as reasonably and properly come within the scope of his contribution to the art.

I claim:

1. A method for reducing coding artifacts of block-based image encoding methods, using a computer, comprising the steps of:

implementing the following steps for picture elements of at least a part of a digitized, decoded image;

checking for neighboring picture elements in said digitized decoded image at a same processing level without intervening filtering that are located in an environment of a picture element under investigation to see whether an amount of a difference between at least one of a brightness value and a color value of the picture element under investigation and a respective one of a brightness value and a color value of a neighboring picture element is below a predetermined threshold;

taking the at least one of the brightness value and the color value of the neighboring picture element into consideration in determining at least one of a new brightness value and of a new color value of the picture element when one of the following conditions is met:

an amount of the difference is lower than the predetermined threshold, and the picture element under investigation and the neighboring picture element are located in different image blocks of the image; and deriving the at least one of the new brightness value and the new color value of the picture element by weighted averaging of at least the at least one of the brightness values and color values of the neighboring picture elements.

2. A method for the reducing coding artifacts of object-based image encoding methods, using a computer, comprising the steps of:

implementing the following steps for picture elements of at least a part of a digitized, decoded image;

carrying out a check for neighboring picture elements that are located in an environment of a picture element under investigation to see whether an amount of a difference between at least one of a brightness value and a color value of the picture element under investigation and a respective one of brightness value and a color value of a neighboring picture element is below a predetermined threshold;

taking the at least one of the brightness value and the color value of the neighboring picture element into consideration in determining at least one of a new brightness value and a new color value of the picture element when both of the following conditions are met:

the amount of the difference is lower than the predetermined threshold, and the picture element under investigation and the neighboring picture element are not located in different image objects of the image; and deriving the at least one of the new brightness value and the new color value of the picture element by weighted averaging of at least the respective brightness values and color values of the neighboring picture elements.

3. A method according to claim 2, further comprising the steps of:

when a block-based image encoding method is additionally employed in the object-based image encoding method and an image object includes image blocks, checking to see whether the picture element under investigation and the neighboring picture element which are both located in a same image object are located in different image blocks of the image object; and taking the at least one of the brightness value and the color value of a neighboring picture element into consideration in determining the at least one of the new brightness value and the new color value of the picture element when the picture element and the neighboring picture element are located in different image blocks of the image object.

4. A method according to claim 1, further comprising the step of:

taking into consideration at least one of the brightness value and the color value of the picture element under investigation in determining the at least one of the new brightness value and the new color value of the picture element under investigation.

5. A method according to claim 2, further comprising the step of:

taking into consideration at least one of the brightness value and the color value of the picture element under investigation in determining the at least one of the new brightness value and the new color value of the picture element under investigation.

6. A method according to claims 1, wherein only picture elements directly adjoining the picture element under investigation are employed as the neighboring picture elements.

7. A method according to claims 2, wherein only picture elements directly adjoining the picture element under investigation are employed as the neighboring picture elements.

8. A method according to claim 1, wherein said method is implemented row-by-row for the picture elements under investigation within the image.

9. A method as claimed in claim 1, wherein said method is implemented column-by-column for the picture elements under investigation within the image.

10. A method according to claim 2, wherein said method is implemented row-by-row for the picture elements under investigation within the image.

11. A method as claimed in claim 2, wherein said method is implemented column-by-column for the picture elements under investigation within the image.

12. A method according to claim 1, further comprising the steps of:

performing a first iteration of the method in a sequence for the picture elements under investigation along a first direction; and performing a second iteration of the method in a sequence for the picture elements under investigation along a second direction.

13. A method according to claim 2, further comprising the steps of:

performing a first iteration of the method in a sequence for the picture elements under investigation along a first direction; and performing a second iteration of the method in a sequence for the picture elements under investigation along a second direction.

14. A method according to claim 13, wherein only picture elements that are located in an environment of the picture element under investigation along a first direction are employed as the neighboring picture elements in the first iteration; and only picture elements that are located in an environment of the picture element under investigation along a second direction are employed as neighboring picture elements in the second iteration.

15. A method according to claim 12, wherein only picture elements that are located in an environment of the picture element under investigation along a first direction are employed as the neighboring picture elements in the first iteration; and only picture elements that are located in an environment of the picture element under investigation along a second direction are employed as neighboring picture elements in the second iteration.

16. A method according to claim 1, further comprising the steps of:

repeatedly applying the method to an image;

determining a quality criterion with respect to the image after each iteration; and implementing a new iteration for the image when the determined quality criterion lie below a predetermined quality threshold.

17. A method according to claim 2, further comprising the steps of:

repeatedly applying the method to an image;

determining a quality criterion with respect to the image after each iteration; and implementing a new iteration for the image when the determined quality criterion lie below a predetermined quality threshold.

18. A method according to claim 1, further comprising the step of: applying the method for image post-processing.

19. A method according to claim 2, further comprising the step of: applying the method for image post-processing.

20. A method according to claim 1, further comprising the step of:

predicting the image in the framework of image encoding and/or image decoding.

21. An image encoding unit for encoding digitized images, comprising:

a first means for transformation coding of a digital image including providing transformation coefficients;

a second means for quantizing transformation coefficients that were formed by the first means in the transformation encoding;

a third means for the inverse quantization of the quantized transformation coefficients;

a fourth means for the inverse transformation coding of the quantized transformation coefficients;

an image storage for storing image data;

a fifth means for predicting image data of two chronologically successive images;

a subtraction unit to which, first, image data of an image to be encoded and, second image data of a chronologically preceding image are supplied, so that only difference image data of two successive images are supplied to the first means and encoded; and a sixth means for eliminating coding artifacts from the digital image, said sixth means considering a brightness value and/or color value of an adjacent image point in said encoded digitized image at a same process level without intervening filtering upon acquisition of a new brightness value or new color value of an image point of the digital image if an amount of a difference between the brightness value and/or color value of the image point and a brightness value and/or color value of the adjacent image point is smaller than a limit, or the image point and the adjacent image point are situated in different image blocks and/or different image objects of the digital image.

22. An image encoding unit according to claim 21, further comprising: a seventh means for segmenting the image into at least one of image blocks and image objects.

23. An image decoding unit for decoding digitized images, comprising:

a means for the inverse quantizating of quantized transformation coefficients;

a means for the inverse transformation coding;

an image storage for storing image data;

a means for predicting image data of two chronologically successive images;

an adder unit to which, first, the quantized transformation coefficients of an image to be decoded and, second, image data of a chronologically preceding, decoded image are supplied, so that predicted image data of two successive images are supplied to the inverse quantizating means and decoded; and a means for eliminating coding artifacts in the digital image, said means for eliminating coding artifacts considering a brightness value and/or color value of an adjacent image point in said digitized decoded image at a same processing level without intervening filtering upon acquisition of a new brightness value or new color value of an image point of the digital image if:

an amount of a difference between the brightness value and/or color value of the image point and a brightness value and/or color value of the adjacent image point is smaller than a limit, or the image point and the adjacent image point are situated in different image blocks and/or different image objects of the digital image.

* * * * *